Figure 1:
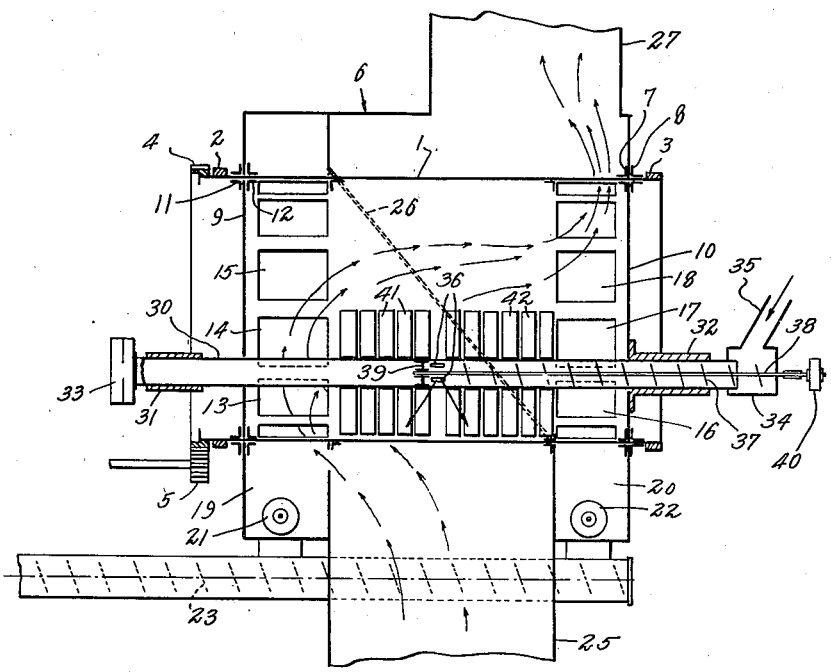

Feb. 26, 1935.　　　J. H. COLTON ET AL　　　1,992,520
METHOD AND APPARATUS FOR DRYING MATERIALS
Filed Nov. 11, 1933

Inventors
James H. Colton
Alfred G. Lang
By Lyon & Lyon
Attorneys

Patented Feb. 26, 1935

1,992,520

UNITED STATES PATENT OFFICE 1,992,520

METHOD AND APPARATUS FOR DRYING MATERIALS

James H. Colton, Berkeley, and Alfred G. Lang, Palo Alto, Calif.

Application November 11, 1933, Serial No. 697,624

9 Claims. (Cl. 159—9)

This invention relates to a method of drying various materials and is particularly applicable to the treatment of slurries such as argillaceous or calcareous slurries of the character used in the manufacture of cement, slurries containing precipitated calcium carbonate such as those encountered in sucrose recovery processes, precipitates of various kinds, etc. The method of this invention may result in the production of substantially dry products or may be used to reduce the water content of a slurry to a desired degree.

The invention is also directed toward a preferred form of apparatus in which the mode of operation characterizing the present invention may be utilized to advantage.

Slurries of the character referred to hereinabove are extremely difficult to dry or rapidly dewater because of the relatively high initial water content of such slurries (which may vary from 25% to 50% or 60%) and the tendency of the material to form lumps, cakes or otherwise agglutinate during the drying operation. Moreover, slurries of this character have a tendency to tenaciously adhere to the surfaces of the equipment used, thereby impairing heat transfer, reducing the capacity of the apparatus, and often completely blocking or choking the same. The method of this invention, however, permits the regulated drying or dewatering of slurries in a rapid and very economical manner and precludes the formation of coatings which tend to choke the apparatus.

Generally stated, the method of the invention contemplates subjecting the moist slurry to a stream of heated gases and distributing the slurry upon preheated metallic surfaces. These metallic surfaces are heated on the reverse side and the moisture carried in the slurry is rapidly driven off when such slurry contacts with the metallic surfaces. Furthermore, the metallic surfaces are heated to a temperature sufficient to cause the slurry to almost instantaneously separate from the surface, such separation being partly due to the instantaneous form of steam between a particle of the slurry and the heated surface. The preferred form of apparatus in which this method is used comprises a rotating drum which is externally heated until the surfaces of the drum reach a temperature above about 250° F. or 300° F. The slurry to be dewatered or dried is fed to the interior of the drum in a manner described more in detail hereinafter and upon contact with the interior surfaces of the heated drum the suitably dried slurry is discharged.

As has been stated hereinbefore, the method and apparatus of this invention are applicable to the treatment of various types of slurries, precipitates, etc., but in order to facilitate understanding of this invention, particular reference will be made hereinafter to the treatment of calcareous and argillaceous slurries for use in the manufacture of Portland cement.

In describing the invention, reference will also be had to the appended drawing, wherein Fig. 1 is a side elevation diagrammatically illustrating an arrangement of elements which has been found to be eminently suited for the performance of the method.

Figure 2:
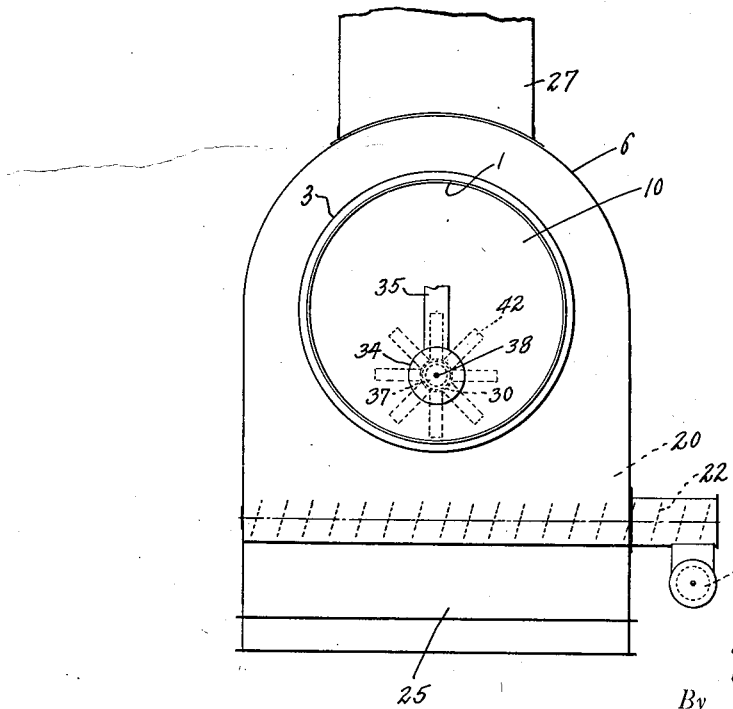

Fig. 2 is an end elevation also diagrammatic in form.

In the wet process of manufacturing Portland cement, the raw materials are ground with water and the resulting slurry is then introduced into the rotary calcining kiln to form the usual clinker. Kilns which handle wet slurries must be considerably larger than kilns of the same capacity in plants operating a dry process. Obviously, the longer and larger kilns are more expensive to install and maintain. Attempts have been made to dewater the cement slurry to a certain extent before feeding it to the kiln. Such prior dewatering attempts have been carried out in continuous filters, the wet cake from these filters being fed to the kiln. Such dewatering equipment is expensive and the cake produced by the filters is often insufficiently dried to permit most satisfactory operation. The advantages of wet grinding and slurry formation may be utilized even by those cement plants which have the shorter kilns (primarily designed for dry operation) by dewatering or drying the slurry in accordance with this invention.

As shown in Fig. 1, the apparatus comprises a cylindrical drum 1 provided with tires 2 and 3 resting on rollers, not shown. One end of the drum 1 may be provided with a ring gear 4 driven by a suitable pinion 5 mounted on a driven shaft.

This drum 1 is preferably mounted in a stationary housing, the ends of the drum 1 protruding from the casing. The casing is indicated at 6. In order to prevent undue passage of gases from within the casing, the exterior surface of the drum is provided with a pair of outwardly extending flanges 7 and 8 adapted to slidably receive the side wall of the casing. The ends of the drum 1 are provided with stationary end plates 9 and 10, these end plates forming a relatively gas-tight connection with the interior surface of the drum by reason of a pair of spaced flanges 11 and 12 extending inwardly from the inner surface of the drum 1. The end plate 9 slidably fits between the flanges 11 and 12.

Within the casing and for a desired distance between the side walls thereof, the drum 1 is provided with openings, such as the openings 13, 14, 15, 16, 17, 18, etc. In other words, the side walls of the drum within the casing and adjacent the end walls or partitions 9 and 10 are suitably perforated so as to permit the passage of gases into and out of the drum. The major central portion of the drum is imperforate.

Beneath each perforated end zone of the drum 1 means are provided for collecting dried or dewatered slurry. Such means may comprise the compartment 19 positioned beneath one of the perforated ends of the drum 1 and the compartment 20 positioned beneath the opposite end. Suitable conveyors, such as the conveyors 21 and 22, may be positioned in such compartments, these conveyors being adapted to carry the dried slurry to a common conveyor, such as the screw type conveyor 23 extending at right angles to the conveyors 21 and 22.

Means are also provided for heating the external surface of the drum 1. Such means comprise the gas inlet conduit 25 which leads directly toward the central and lower portion of the drum 1. Suitable means, such as the baffle 26, are provided for the purpose of preventing the hot gases from readily passing around the drum 1 and into the outlet conduit 27. Preferably, the baffle or baffles 26 are so arranged as to direct the heated gases through a suitable port 28 leading to one of the perforated or slotted end zones of the drum 1. As shown in the drawing, the port 28 permits the gases from the inlet conduit 25 to pass into the openings 13, 14 and 15 formed in the left hand end of the drum 1. These gases may then pass longitudinally through the drum 1 and be discharged through the ports 16, 17, 18, etc. at the opposite end of the drum, whence they move into the conduit 27 which is usually connected with the stack.

Any suitable source of heat may be employed but in most instances waste heat is available for use in the apparatus described. When the method and apparatus of this invention are used in the drying or dewatering of cement mix slurries, the conduit 25 may be connected with the feed end of the rotary kiln so that the hot waste gases may pass directly from the kiln into contact with the exterior surfaces of the drum 1.

Means are also provided for feeding the slurry into the revolving drum 1. The slurry may be fed by a number of devices but the arrangement shown in Fig. 1 has been found to be very satisfactory. The preferred feeding and distributing means comprise a hollow pipe shaft 30 extending longitudinally through the drum 1 with its axis in the lower portion of said drum. This pipe shaft may be mounted in suitable bearings 31 and 32 positioned exteriorly of the drum. Means are provided for rotating the pipe shaft 30 such as, for example, the pulley 33 attached to one end thereof. The opposite end of the pipe shaft 30 fits into a stationary feed hopper 34 which may be supplied with the slurry through the feed line 35.

The pipe shaft 30, at a point within the drum 1 and preferably at a point equi-distant from the series of ports 13 to 18 formed in the end zones of said drum, is provided with a series of openings indicated at 36. The slurry fed into the hopper 34 is advanced through the hollow shaft 30 by means of a screw conveyor 37 terminating at the ports 36 formed in the hollow shaft 30. The end of the shaft 38, on which the screw conveyor 37 is mounted, is journaled in bearings 39 carried within the pipe shaft 30 and beyond the series of ports 36. Means are provided for driving the shaft 38 and thereby driving the screw conveyor 37. Such means are generally indicated at 40.

The pipe shaft 30 carries two sets or series of distributing arms indicated at 41 and 42. The series of distributing arms 41 is partly or slightly inclined so as to feed dried slurry toward the ports 13, 14, 15, etc. The series of arms 42 is oppositely inclined so as to feed dried slurry toward the openings 16, 17 and 18. The arms 41 and 42 are of such length as to almost come into contact with the lower interior surface of the drum 1. In order to effectively feed slurry through the hollow pipe shaft 30, a difference in rotational speeds must exist between the pipe shaft 30 and the conveyor shaft 38. The two shafts may rotate in the same direction but usually best results are obtained by driving these two shafts in opposite directions.

The method of this invention is utilized in the above described apparatus as follows: Hot gases such as waste cement kiln gases at a temperature of approximately 1000°, are passed into the conduit 25 and practically encircle the drum 1, raising its temperature to not less than 250° F. and preferably to about 350° F. The gases then pass through the ports 28, 13, 14, and 15, etc., into the interior of the drum. The gases then pass longitudinally through the drum and are discharged through the ports 16, 17 and 18 in the opposite end, from whence they pass into the stack or discharge conduit 27. The slurry being supplied by line 35 into the hopper 34 is advanced by means of the conveyor 37 into the center of the drum and discharged by ports 36 of the shaft 30. The arms 41 and 42 distribute the wet slurry over the preheated internal surfaces of the drum 1. The slurry upon contact with such preheated surfaces quickly loses a large proportion of water, the rapid escape of water in the form of steam causing the particles of slurry to break away from the interior surfaces of said drum with almost explosive force. The arms 41 and 42 not only distribute the wet slurry over the interior surface of the drum 1 but in addition move the slurry towards the outs 13 to 18. The dried slurry falls through such outlets into the compartments 19 and 20 from whence such dried slurry is removed by the conveyors 21 and 22 and discharged into the main conveyor 23. Such conveyor 23 may feed the dried slurry directly into the cement kiln.

Attention is called to the fact that the hot gases contact with the exterior surface of the drum and impart the greater proportion of the heat carried thereby to the drum before passing through the ports 13, 14, 15, etc., into the drum. The slurry upon being distributed over the internal surfaces of the drum will not cake thereon because, as hereinbefore stated, the rapid elimination of moisture prevents any adhesive contact between the slurry and the walls of the drum.

The amount of heat necessary to control the proper amount of dewatering of the slurry is maintained by suitable manually or mechanically operated dampers positioned in the intake conduit 25. The unused waste gases from the cement kiln may bypass the drying unit. Dampers and bypass lines have not been shown in the drawing as those skilled in the art will readily understand the arrangement and utilization of such elements. The cement slurries ordinarily supplied to driers of this invention may have a moisture content of from 30% to 55%. Such slurries are preferable not completely dewatered in the drier but instead are discharged from the drier in the form of lumps or pellets which can be readily operated with the fingers. The moisture content of such dewatered product may vary from 24% to 30%. In cement mill operation, it is not desirable to vaporize all of the water from the slurry as this would result in a feed of such dryness as to give rise to considerable dust loss, the finer particles being carried out with the kiln gases into the stack. Incidentally, when kiln gases are used for drying purposes in an apparatus of the character described hereinabove, a relatively large proportion of whatever dust may be carried by such gases is absorbed by the moist or wet slurry being distributed over the interior surfaces of the drum 1, the gases passing transversely through the slurry near the center of the drum 1.

It may also be mentioned that calcareous slurries may be dried in the apparatus described hereinabove and by the method herein claimed to produce a product of considerably increased volume. The volume of the slurry after processing may be approximately double the size of the unheated slurry entering the drier or evaporator. This change is caused by the absorption of carbon dioxide contained in the waste gases with which the slurry comes into intimate contact during its passage through the evaporator. A porous, bulky product is highly desirable inasmuch as the heat used in the kiln itself penetrates such lumps of dried slurry with greater facility.

Numerous modifications, uses and adaptations of the invention described hereinabove may be made. The method and apparatus may be advantageously used whenever it is desirable or necessary to partly or completely dewater a slurry, and the character of the slurry may greatly vary. The actual temperatures used may also vary, depending upon the constituents present in the slurry. At all events, the temperature of the gases used in heating the rotating drum 1 should be sufficient to maintain such drum at a temperature of above 250° on its inner surface so that the slurry distributed over such surface will readily flake or burst off and thereby prevent the formation of adhering clumps which would choke the apparatus.

Although a preferred form of apparatus has been described in considerable detail, it is to be understood that the method of this invention may be carried out in other driers of widely diverging design.

All such changes and modifications as come within the scope of the appended claims are embraced thereby.

We claim:

1. In an apparatus of the character described, the combination of: a substantially horizontal rotatable cylinder, stationary heads at the ends of said cylinder, circumferentially spaced openings in said cylinder adjacent each of said heads, means for passing heated gases around said cylinder and into one end of said cylinder through said circumferentially spaced openings at one end of said cylinder, means for conducting gases away from the circumferentially spaced openings at the other end of the cylinder, means for feeding slurry into said cylinder, and means for distributing slurry on the interior surface of the cylinder.

2. In an apparatus of the character described, the combination of: a substantially horizontal rotatable cylinder, stationary heads at the ends of said cylinder, circumferentially spaced openings in said cylinder adjacent one of the heads, means for passing heated gases around said cylinder and into said openings, means for discharging gases from said cylinder, means for feeding slurry into said cylinder, and means for distributing the slurry on the interior surface of the cylinder, said last named means comprising a rotatable shaft within said cylinder and a plurality of arms carried by said shaft.

3. In an apparatus of the character described, the combination of: a substantially horizontal rotatable cylinder, stationary heads at the ends of said cylinder, circumferentially spaced openings in said cylinder adjacent one of the heads, means for passing heated gases around said cylinder and into said openings, means for discharging gases from said cylinder, means for feeding slurry into said cylinder, and means for distributing the slurry on the interior surface of the cylinder, said slurry feeding and distributing means comprising a hollow pipe shaft extending through said cylinder in the lower portion thereof, ports in said shaft at a point midway between the ends of said cylinder, means for rotating said shaft, a plurality of arms carried by said hollow shaft, and a conveyor mounted within said hollow shaft, said conveyor being adapted to discharge slurry through said ports in said hollow pipe shaft.

4. In an apparatus of the character described, the combination of a substantially horizontal rotatable cylinder, openings in the walls of the cylinder adjacent each end thereof, means for passing heated gases around said cylinder, a hollow pipe shaft extending through said cylinder in the lower portion thereof, ports in said shaft at a point within said cylinder and between said cylinder wall openings, a conveyor mounted within said hollow shaft and adapted to discharge slurry through said ports in said hollow shaft, and means for distributing slurry along the inner surfaces of said cylinder and moving the dried slurry in opposing directions from said ports and toward said cylinder wall openings.

5. In a method of reducing the moisture content of argillaceous and calcareous slurries, the steps of continuously passing heated gases into contact with one side of a metallic heat-conductive plate to maintain the same at a temperature above about 250° F., distributing a moving slurry upon the other side of said heat-conductive plate whereby the moisture content of the slurry is rapidly driven off and the slurry is prevented from adhering to the surface of said plate, and simultaneously passing heated dust-containing gases over said distributed and moving slurry whereby dust contained in said gases is retained on the slurry.

6. In an apparatus of the character described, the combination of: a substantially horizontal rotatable cylinder, openings in the walls of the cylinder adjacent each end, means for passing heated gases into contact with the exterior surface of said cylinder, a hollow pipe shaft extending through said cylinder in the lower portion thereof, ports in said shaft at a point within said cylinder and between said cylinder wall openings, means for supplying slurry to and discharging slurry from said ports into the cylinder, and means for distributing slurry along the inner surfaces of said cylinder and moving the treated slurry in opposing directions from said ports and toward said cylinder wall openings.

7. In an apparatus of the character described, the combination of: a substantially horizontal rotatable cylinder, stationary heads at the ends of said cylinder, openings in the walls of said cylinder adjacent one of the heads, means for passing heated gases into contact with the exterior surface of said cylinder and into said openings, means for discharging gases from the opposite end of said cylinder, means for feeding slurry into said cylinder, and means for distributing the slurry on the interior surface of the cylinder, said slurry feeding and distributing means comprising a hollow pipe shaft extending through said cylinder in the lower portion thereof, ports in said shaft at a point midway between the ends of said cylinder, means for rotating said shaft, a plurality of arms carried by said hollow shaft, and means for introducing slurry into said cylinder through said shaft and ports.

8. In an apparatus for dewatering calcareous and argillaceous slurries for use in the manufacture of hydraulic cement and for recovering dust from heated gases, the combination of: a rotatable cylinder provided with closed ends, openings in the wall of the cylinder adjacent one of the ends, means for passing hot dust-containing gases into contact with the exterior surface of said cylinder and into said wall openings, means for discharging gases from the opposite end of said cylinder, means for supplying slurry to the interior of said cylinder, a shaft extending through the cylinder in the lower portion thereof, arms carried by said shaft and means for rotating said shaft whereby slurry is distributed on the interior surface of the cylinder and brought into contact with dust-containing gases passing through said cylinder.

9. In an apparatus for dewatering calcareous and argillaceous slurries for use in the manufacture of hydraulic cement and for recovering dust from heated gases, the combination of: a rotatable cylinder provided with closed ends, openings in the wall of the cylinder adjacent each end thereof, means for passing hot dust-containing gases into contact with the exterior surface of said cylinder and into openings adjacent one end of said cylinder, means for discharging gases from said cylinder through openings at the opposite end thereof, means for supplying slurry to the interior of said cylinder, a rotatable shaft extending through the cylinder in the lower portion thereof, arms carried by said shaft, and means for rotating said shaft whereby slurry is distributed on the interior surfaces of the cylinder and brought into contact with dust-containing gases passing through said cylinder.

JAMES H. COLTON.
ALFRED G. LANG.